US008578823B2

(12) United States Patent
Hale

(10) Patent No.: US 8,578,823 B2
(45) Date of Patent: Nov. 12, 2013

(54) RING LOCK MANDREL AND RELEASE MECHANISM

(75) Inventor: Troy Hale, Goodlettsville, TN (US)

(73) Assignee: Simpson Strong-Tie Company Inc., Pleasanton, CA (US)

( * ) Notice: Subject to any disclaimer, the term of this patent is extended or adjusted under 35 U.S.C. 154(b) by 403 days.

(21) Appl. No.: 12/899,398

(22) Filed: Oct. 6, 2010

(65) Prior Publication Data

US 2012/0085204 A1 Apr. 12, 2012

(51) Int. Cl.
*B23B 31/107* (2006.01)
*B25B 23/00* (2006.01)

(52) U.S. Cl.
USPC .............................................. 81/438; 279/79

(58) Field of Classification Search
USPC .................. 81/436–438, 125, 177.1, 177.85; 279/79
See application file for complete search history.

(56) References Cited

U.S. PATENT DOCUMENTS 1,862,623 A * 6/1932 Harrington .................... 279/76
2,869,883 A * 1/1959 Dunbar .......................... 279/56
3,861,694 A * 1/1975 Weber ............................ 279/79
4,535,658 A * 8/1985 Molinari ......................... 81/438
5,884,541 A 3/1999 Habermehl et al.
2008/0087142 A1* 4/2008 Lin ............................. 81/177.1
2008/0100005 A1 5/2008 Chen

FOREIGN PATENT DOCUMENTS

EP 2133175 A2 12/2009

OTHER PUBLICATIONS

International Search Report and Written Opinion dated Jan. 12, 2012 in International Patent Application No. PCT/US2011/055135.

* cited by examiner

*Primary Examiner* — Hadi Shakeri
(74) *Attorney, Agent, or Firm* — Vierra Magen Marcus LLP

(57) ABSTRACT

A mandrel is disclosed for securely holding a screw bit during use, but allowing easy removal of the screw bit for replacement. The mandrel includes a socket having a chamber housing a locking mechanism such as a split-ring. The mandrel further includes a release mechanism such as one or more ears for moving the locking mechanism from a first position where the screw bit is held within the socket and a second position where the screw bit may be removed from the socket.

11 Claims, 10 Drawing Sheets

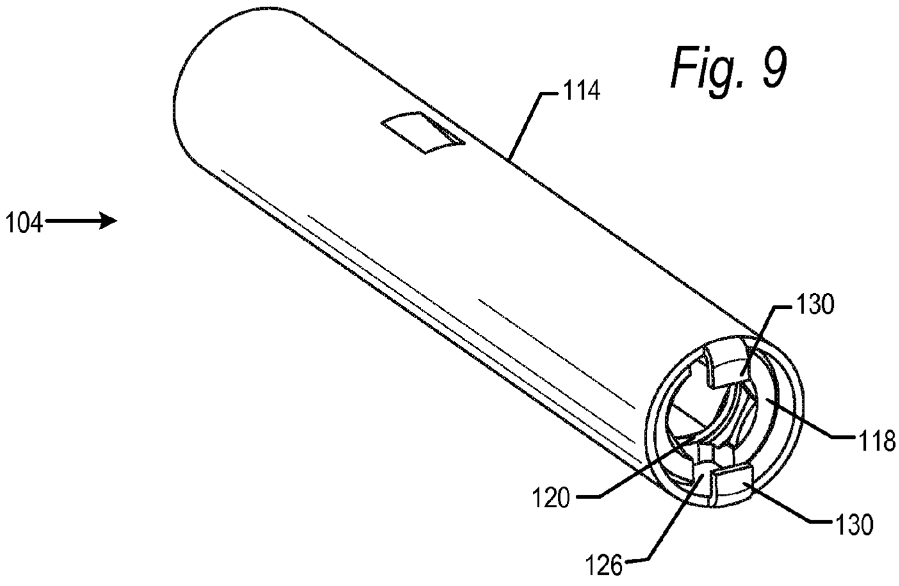
Fig. 9
Fig. 10
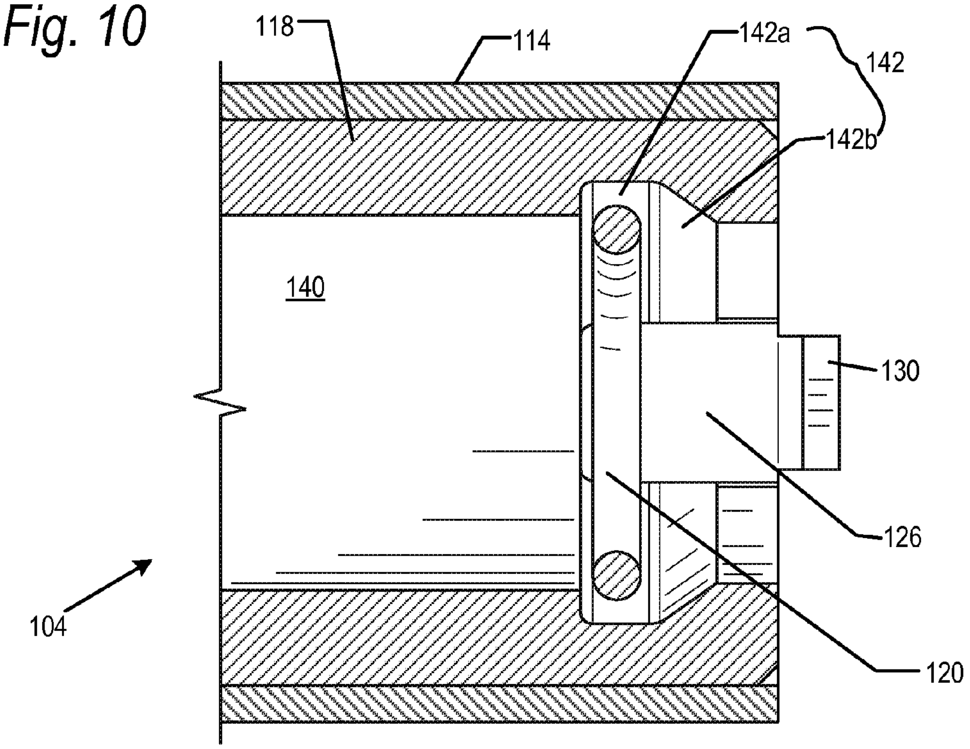

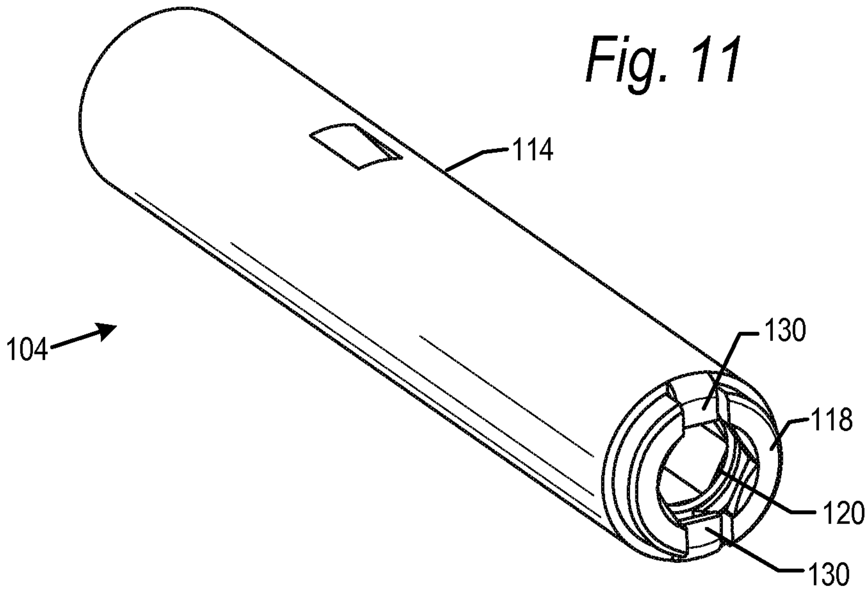
Fig. 11
Fig. 12
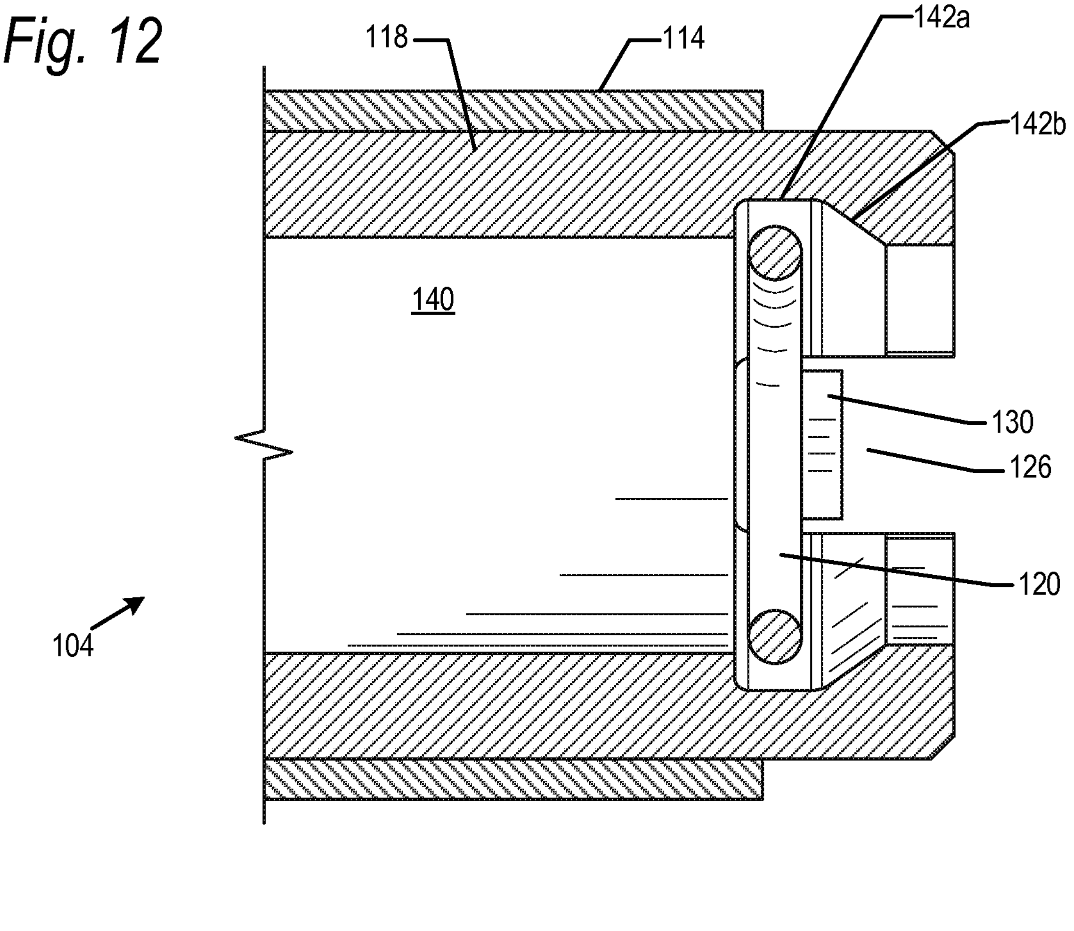

RING LOCK MANDREL AND RELEASE MECHANISM

BACKGROUND

1. Field

The present technology relates to mechanisms for fastening and releasing a bit with respect to a mandrel.

2. Description of the Related Art

Screwdrivers have removable bits for engaging and driving screws into a workpiece. These screwdrivers typically have an elongate mandrel having an end into which a screw bit is removably coupled. Screws have a wide variety of screw drives in the head of the screw, including for example slotted, Phillips head, Robertson (square) and hex to name but a few. Each time a different type of screw drive is used, the screw bit of the screwdriver needs to be changed out.

In many screwdrivers, the bit is coupled to the mandrel by threads. For example, in a power screwdriver disclosed in U.S. Pat. No. 4,146,071 to Mueller et al., issued Mar. 27, 1970, the bit has a reduced diameter externally threaded male portion to be received within an internally threaded female socket in the mandrel. Threaded couplings have the disadvantages that the mandrel and bits are both expensive and it is also difficult and time consuming to change the bit.

The power screwdriver of U.S. Pat. No. 4,146,071 utilizes a system in which the head of a screw is located and retained in coaxial alignment with the mandrel and bit by the head of the screw engaging a part-cylindrical guideway member having a diameter approximately equal to the diameter of the head of the screw. In such a configuration, it is necessary that the mandrel and bit be of a sufficiently small diameter that the mandrel and bit may reciprocate axially through the part-cylindrical guideway member. The constraints of the mandrel and bit being of a diameter not greater than the diameter of the screw head renders replacement of the threaded coupling of the bit to the mandrel with another system difficult.

Other bit to mandrel coupling systems are known in which the mandrel carries a split-ring in a deep groove in a socket in the mandrel. A split-ring is a ring of resilient material, typically metal, where the ring is split so that it can expand around larger diameter objects and contract back to its original size when in an unbiased position. One such example is shown in prior art FIG. 1, which shows a mandrel 20 including a split-ring 22 partially engaged in a mandrel groove 24 (all of which are shown in cross-section). FIG. 1 further shows a bit 26 engaged within the mandrel 24 and driving a screw 30 into a workpiece 32.

The bit 26 for use with mandrel 20 also includes an annular groove 28 around an outer circumference of the bit 26. When the bit 26 is inserted into the mandrel 20, the split-ring 22 retains the bit 26 in the mandrel 20 by the split-ring 22 being partially received in the groove 24 in the mandrel and partially within the groove 28 around about the bit. Such known systems suffer the disadvantage that the coupling may generally hold the bit too loosely so that it may come off the mandrel too easily, or hold the bit too tightly so that it is difficult to remove. Furthermore, as parts wear over time, the force required to remove the bit may decrease. Thus, even if the correct balance (not too loose, not too tight) is provided initially, over time, this balance may shift to a situation where the bit is held too loosely.

SUMMARY

Embodiments of the present technology relate to a mandrel for securely holding a screw bit during use, but allowing easy removal of the screw bit for replacement. The mandrel includes a cylindrical socket for receiving a screw bit and a cylindrical cover translationally mounted over the socket. A chamber is defined within an interior of the socket having a first, cylindrical section with a constant diameter and a second, conical section where the walls taper inward toward a distal tip of the socket. A locking mechanism is housed within the chamber and is capable of moving between the first and second sections of the interior chamber. In embodiments, the locking mechanism is a resilient split-ring.

A bit for use with the mandrel of the present technology may include an annular bit groove around its circumference. The split-ring expands to accept the bit, and then contracts into the bit groove when the bit is fully inserted into the mandrel. If attempt is made to remove the bit by pulling on it distally, the split-ring moves distally with the bit until the split-ring contacts a conical wall of the second section of the interior chamber. At that point, the split-ring is wedged in the bit groove by the conical wall and is prevented from being removed from the socket.

In one embodiment, the socket further includes a pair of spaced apart slots extending proximally from a distal tip of the socket. The slots extend through the first and second sections of the interior chamber. The cover includes a release mechanism capable of biasing the split-ring away from the conical wall back into the first section so that the bit may be removed. In one embodiment, the release mechanism may be a pair of ears formed on the translating cover. When the cover is moved proximally relative to the socket, the ears move the split ring into the first, cylindrical section, where the split-ring has room to expand out of the bit groove as the bit is pulled distally out of the socket.

In one example, the present technology relates to a mandrel including: a socket for receiving the bit, the socket including a locking mechanism mounted within a chamber in an interior of the socket, the locking mechanism moving between a first position where the locking mechanism binds between the bit groove of the bit and a wall of the socket as the bit is pulled distally to prevent distal withdrawal of the bit, and a second position where the locking mechanism may be removed from the bit groove as the bit is pulled distally; and a release mechanism translationally mounted to the socket, the release mechanism capable of moving the locking mechanism from the first position to the second position as the bit is pulled distally.

In another example, the present technology relates to a mandrel including: a socket for receiving the bit, the socket including an annular split-ring mounted within a chamber in an interior of the socket, the split-ring moving between a first position where the split-ring binds between the bit groove of the bit and a sloped wall of the chamber as the bit is pulled distally to prevent distal withdrawal of the bit, and a second position where the split-ring may expand and be removed from the bit groove as the bit is pulled distally; and a release mechanism translationally mounted to the socket, the release mechanism including at least one ear capable of moving the split-ring from the first position to the second position as the bit is pulled distally.

In another example, the present technology relates to a method of releasably holding a bit within a distal end of a screwdriver, the bit including a bit groove, the method comprising: (a) defining a chamber within a socket of the mandrel, the chamber including a first section with cylindrical walls and a second section with conical walls having a smaller diameter than the cylindrical walls of the first section; (b) positioning an annular split-ring in the chamber, the annular split ring capable of moving between the first and second sections, and the annular split-ring capable of fitting snugly within the bit groove when the bit is inserted into the socket through the split-ring; (c) binding the bit within the socket by the split-ring engaging the bit groove and a conical wall of the second section upon attempted removal of the bit from the socket in the distal direction; and (d) moving the split-ring from the second section of the socket to the first section of the socket to allow expansion and removal of the split ring from the bit groove and removal of the bit from the socket upon a force in the distal direction.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The present technology will now be described with reference to the following drawings.

FIG. 9 is a perspective view of an end of the mandrel according to the present technology without a bit and with the cover in an unbiased position.

FIG. 10 is a cross-sectional view of an end of the mandrel according to the present technology without a bit and with the cover in an unbiased position.

FIG. 11 is a perspective view of an end of the mandrel according to the present technology without a bit and with the cover in a translated position.

FIG. 12 is a cross-sectional view of an end of the mandrel according to the present technology without a bit and with the cover in a translated position.

DETAILED DESCRIPTION

The present technology will now be described with reference to FIGS. 1 through 16 which in embodiments relate to a mandrel for securely holding a screw bit during use, but allowing easy removal of the screw bit for replacement. It is understood that the present technology may be embodied in many different forms and should not be construed as being limited to the embodiments set forth herein; rather these embodiments are provided so that this disclosure will be thorough and complete and will fully convey the technology to those skilled in the art. Indeed, the technology is intended to cover alternatives, modifications and equivalents of these embodiments, which are included within the scope and spirit of the technology as defined by the appended claims. Furthermore, in the following detailed description of the present technology, numerous specific details are set forth in order to provide a thorough understanding of the present technology. However, it will be clear to those of ordinary skill in the art that the present technology may be practiced without such specific details.

Figure 1:
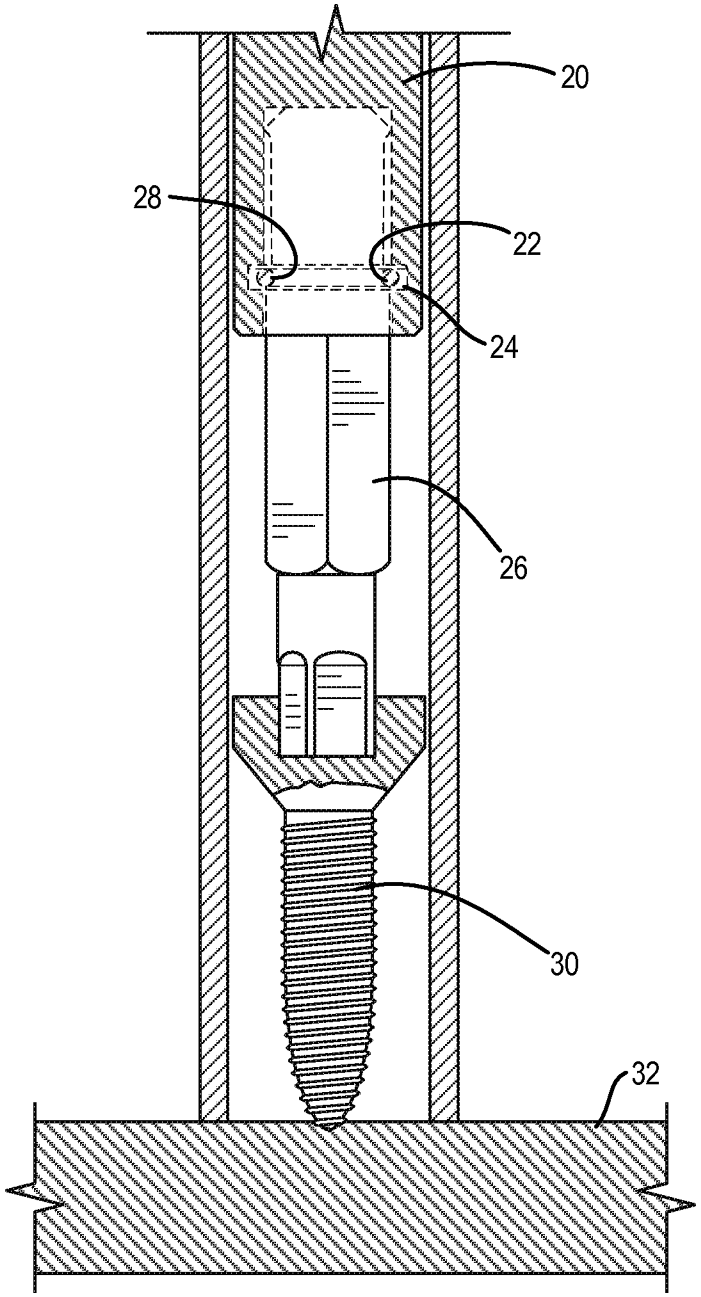
Fig. 1 (Prior Art)
FIG. 1 is a prior art view of a mandrel holding a screw bit.
Figure 2:
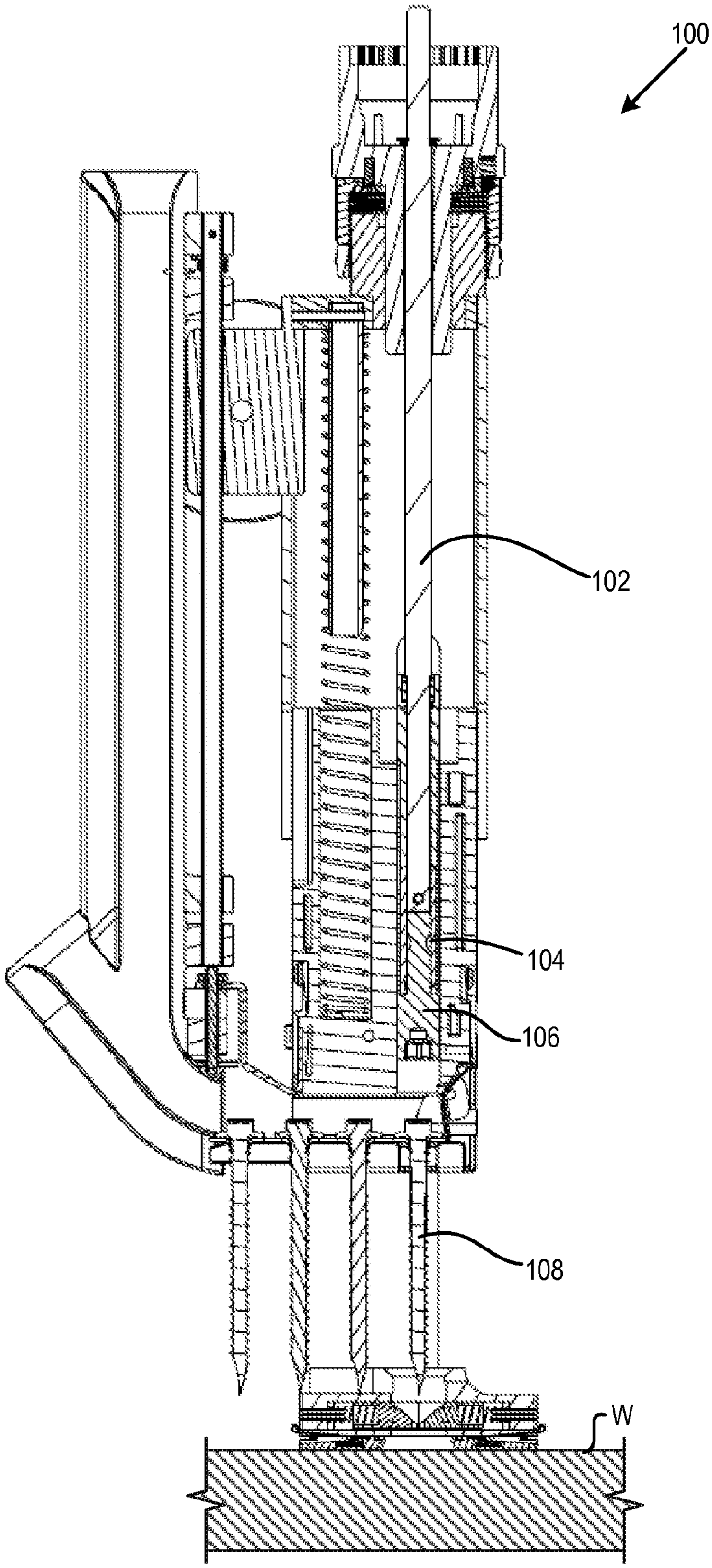
FIG. 2 is a portion of a screwdriver including a mandrel according to the present technology.

FIG. 2 shows a cross-sectional view of a power screwdriver 100 including an axial drive assembly 102 with a mandrel 104 according to embodiments of the present technology at a distal end of the drive assembly 102. The details of the screwdriver 100 apart from axial drive assembly 102 are not critical to the present invention. The screwdriver may in general include a variety of mechanisms for rotating axial drive assembly 102 and translating axial drive assembly 102 so that a screw bit 106 engaged within mandrel 104 is able to drive a screw 108 into a workpiece W. While embodiments of the present technology are adapted for use on a power screwdriver 100 such as shown in FIG. 2, it is understood that the mandrel 104 as described below may be adapted for use on a manual, hand-driven screwdriver in further embodiments.

Figure 3:
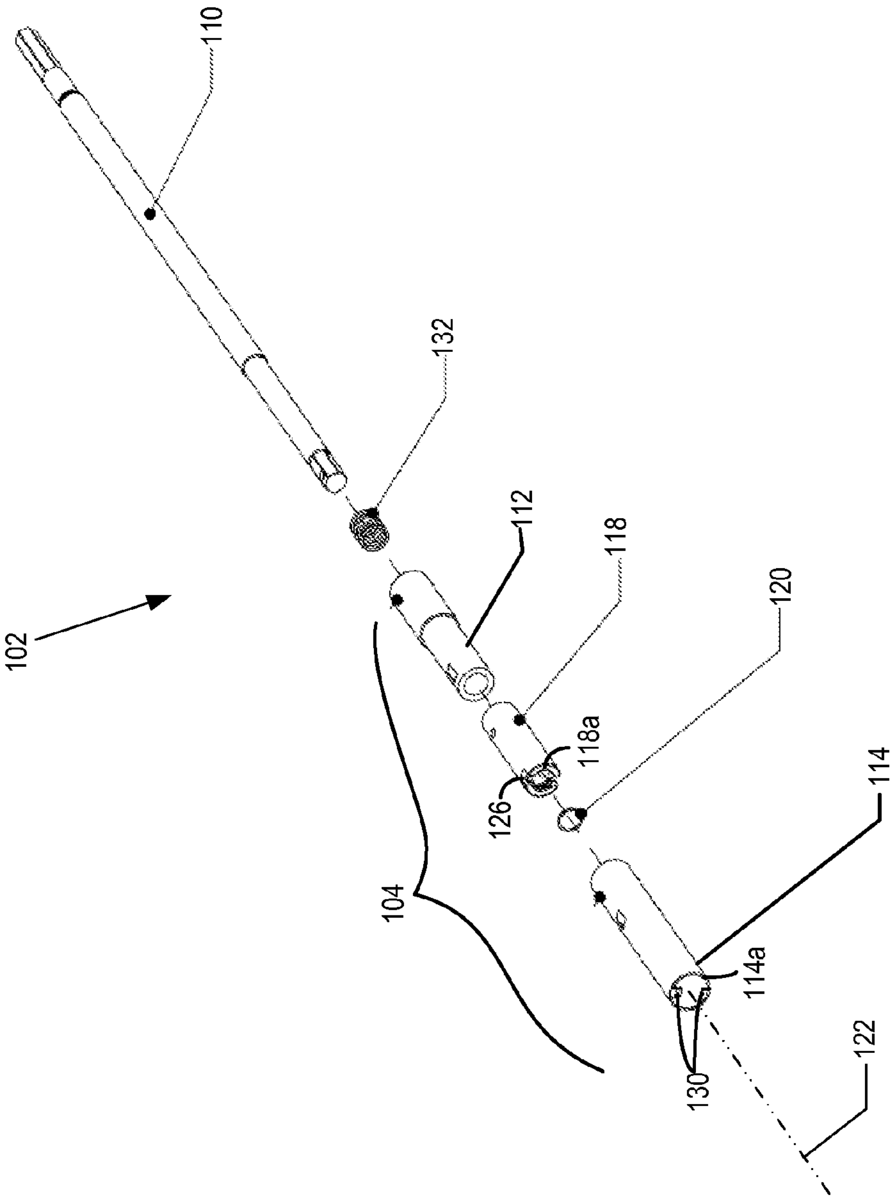
FIG. 3 is an exploded perspective view of a drive assembly including a mandrel according to the present technology.

FIG. 3 shows an exploded perspective view of the axial drive assembly 102. The axial drive assembly includes mandrel 104 and a drive shaft 110 for transmitting torque and translational forces from the screwdriver 100 to the mandrel 104. The mandrel 104 includes cylindrical base 112 fitting together with a cylindrical cover 114. The mandrel 104 further includes a socket 118 and a locking mechanism which in embodiments may be split-ring 120. Referring to FIG. 3 and the further perspective view of FIG. 4, the socket 118 fixedly mounts to the drive shaft 110. As explained below, the socket 118 includes an annular chamber in which the split-ring 120 is held.

A release mechanism in the form of the cylindrical cover 114 fits over a portion of the cylindrical base 112 so that the base 112 and cover 114 are fixed with respect to each other. The base 112 and cover 114 are both circumjacent around the outer periphery of socket 118 with an end 118*a* of socket 118 being generally coplanar with an end 114*a* of cover 114. This relationship is shown more clearly for example in FIGS. 10, 13 and 14 described below. The socket end 118*a* includes a pair of slots 126 open to the end 118*a* and extending in a direction parallel to a central axis 122 of mandrel 104. The slots 126 (only one of which is numbered in FIGS. 3 and 4) may be oriented 180° apart from each other in a wall of socket 118. In further embodiments there may be more than two slots 126, such as for example four slots oriented 90° from each other. The slots 126 may extend for example ¼ inch from socket end 118*a*, though this distance may be more or less in further embodiments.

The socket 118 may for example be formed of steel, and may have a central bore sized to receive a bit as explained below. The socket 118 may have a second end, opposite end 118*a*, with a bore to securely affix socket 118 to shaft 110 so that torque and translational force on shaft 110 are transmitted to socket 118. The walls of the socket may for example be 0.072 inches thick. The material from which socket 118 is formed, and the wall thicknesses of socket 118, may both vary from that described above in further embodiments.

Cylindrical cover 114 includes a biasing mechanism which in embodiments may be a pair of ears 130 in end 114*a*. The ears 130 may be oriented 180° apart from each other in end 114*a* and may extend inward toward axis 122 of cover 114, generally at a right angle to the cylindrical walls forming the cover 114. In further embodiments, there may be more than two ears 130, such as for example four ears oriented 90° from each other. When assembled as explained below, the ears 130 are received within slots 126. The base 112 and cover 114 may be pinned to the shaft 110 by a fastener (not shown) so as to be able to translate over the socket 118, along axis 122, a distance generally equal to the length of slots 126 in socket 118. A spring 132 biases the base 112 and cover 114 to a distal position where the end of cover 114 is generally coplanar with the end of socket 118. As used herein, "distal" is closer to socket end 118*a* and "proximal" is further way from socket end 118*a*.

The base 112 may for example be formed of steel, and may have a central bore sized to fit snugly over the socket 118 while still being capable of freely translating over socket 118 along the central axis 122. The cover 114 may for example be formed of aluminum, and may have a central bore sized to fit snugly over the base 112. The walls of the cover 114 may for example be 0.027 inches thick. The material from which the base 112 and cover 114 are formed, as well as the wall thicknesses of these components, may both vary from that described above in further embodiments. In other embodiments, the base 112 and cover 114 may be formed of a unitary construction.

Figure 5:
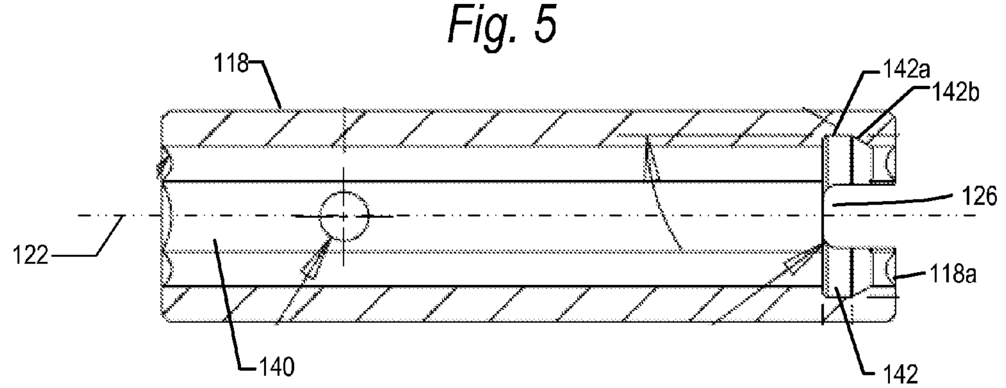
FIG. 5 is a cross-sectional view of a socket of a mandrel according to the present technology
Figure 6:
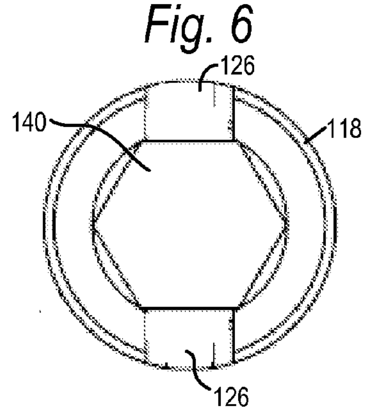
FIG. 6 is an end view of a socket of a mandrel according to the present technology.

FIG. 5 shows a cross-section of socket 118 along a view parallel to axis 122. The socket 118 includes an internal bore 140 which opens up to a wider annular chamber 142 toward the distal end 118*a* of the socket 118. As noted above, the bore 140 may be sized to snugly receive a screw bit as explained below. Furthermore, in order to transfer torque from the socket to the bit, the bore may have a non-circular shape matching the non-circular shape of the bit. FIG. 6 is a cross-sectional view of socket 118 in a plane perpendicular to axis 122. In the example shown, bore 140 may have a hexagonal cross-section which matches a cross-section of the screw bit. The bore 140 and bit may have other cross-sectional shapes in further embodiments, such as for example octagonal.

Annular chamber 142 includes a first cylindrical section 142*a* and a second conical section 142*b*. The cylindrical section 142*a* is defined along its axial length (parallel to central axis 122) by constant-diameter interior walls of the socket 118. The conical section 142*b* is defined along its axial length (parallel to central axis 122) by decreasing-diameter interior walls of the socket 118. Thus, the diameter of conical section 142*b* gets smaller closer to the distal end 118*a* of socket 118. The slots 126 are formed in the socket end 118*a* so as to extend through both the conical section 142*b* and the cylindrical section 142*a* as shown.

The cylindrical section 142*a* is sized so that the split-ring 120 fits therein as explained below. The conical section 142*b* has a range of diameters along its axial length so that, at some point along the axial length, the diameter is smaller than the diameter of split-ring 120 when engaged within a slot in the bit. These size relationships of the portions of the chamber 142 to the diameters of the split-ring 120 are also explained below.

Figure 7:
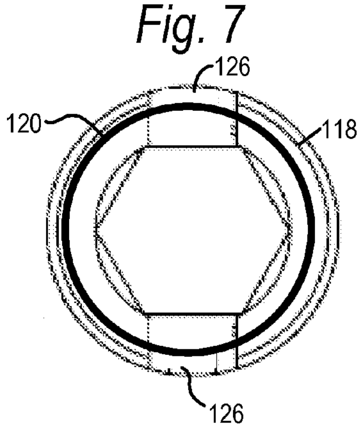
FIG. 7 is an end view of a socket and a split-ring of a mandrel according to the present technology.
Figure 7A:
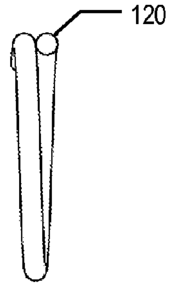
FIG. 7A is a side view of a split-ring according to an embodiment of the present technology.

FIG. 7 shows the cross-sectional view of the socket 118 as in FIG. 6, but further shows the split-ring 120 seated within the chamber 142. As shown in FIG. 7A, the split-ring 120 is so named because it is split and includes an overlap or gap allowing the diameter of the split-ring to expand, for example when the bit is received through the split-ring as explained below.

Figure 8:
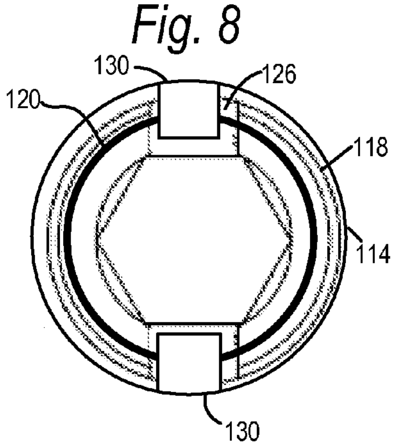
FIG. 8 is an end view of a socket, split-ring and cover of a mandrel according to the present technology.

FIG. 8 shows the cross-sectional view as in FIG. 7, but further shows the cover 114 circumjacent about the socket 118. The ears 130 of cover 114 extend toward a center of the socket so that a distance between opposed ends of the ears 130 is smaller than a diameter of the split-ring 120.

An operation of the mandrel 104 according to the present technology will now be explained with reference to the perspective and cross-sectional views of FIGS. 9-15. In general, the present technology provides a mandrel that effectively secures a bit within the mandrel during use, and prevents the mandrel from being removed by a pulling action alone. In order to remove the bit from the mandrel, the pulling action is accompanied by a secondary action, which actions together allow easy removal of the bit from the mandrel.

The perspective and cross-sectional views of FIGS. 9 and 10 show a distal end of mandrel 104 including cover 114 and socket 118 at rest and without a screw bit. The split-ring 120 is seated within the cylindrical section 142*a* and the ears 130 are generally coplanar with socket end 118*a*.

Figure 4:
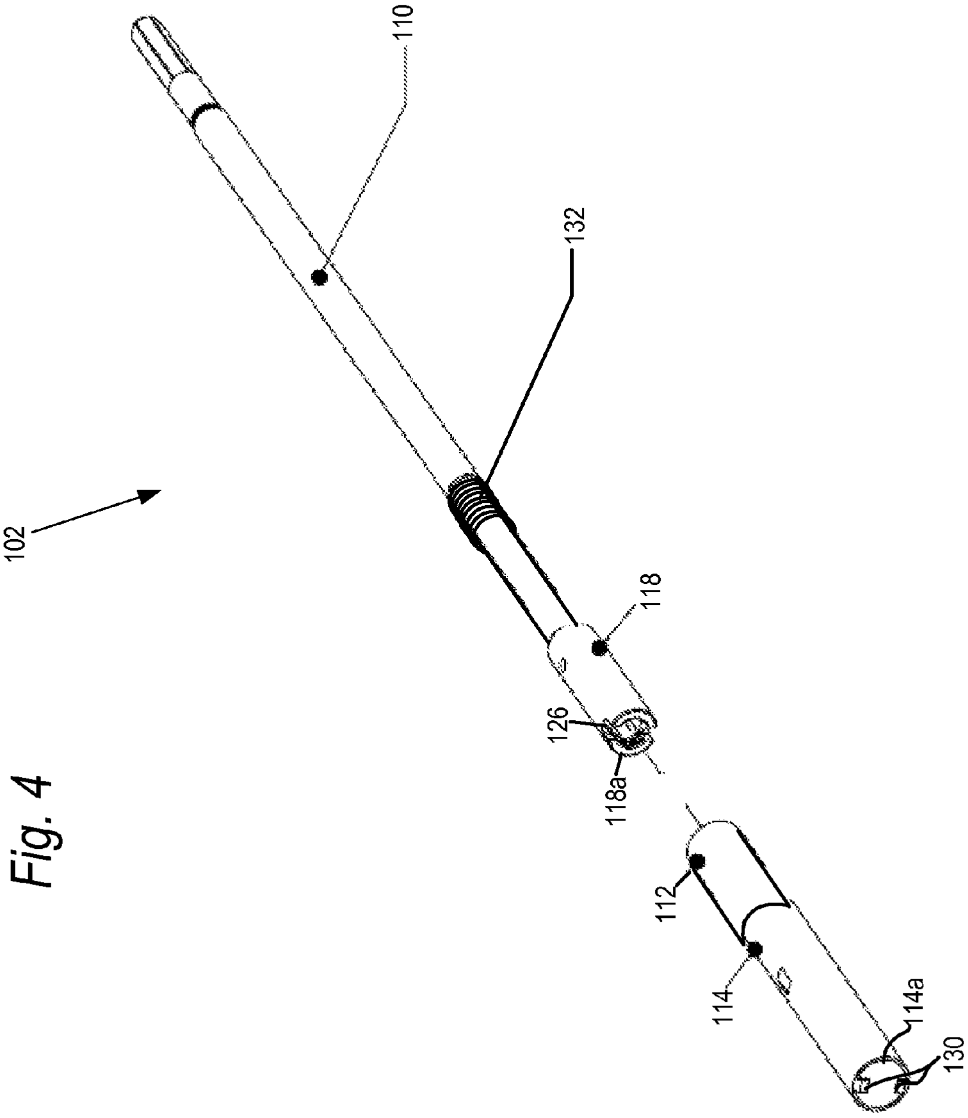
FIG. 4 is a partially assembled perspective view of a drive assembly including a mandrel according to the present technology.

FIGS. 11 and 12 show perspective and cross-sectional views as in FIGS. 9 and 10. However, in FIGS. 11 and 12, the cover 114 has been moved proximally relative to socket 118 in the direction of arrow A against the biasing force of spring 132 (FIGS. 3 and 4). As a result, the ears 130 engage split-ring 120 to bias the split-ring 120 proximally within chamber 142. The movement of cover 114 proximally is performed manually by a user, and may be considered a "secondary action" as that term is used herein. The diameter of bore 140 is provided relative to the diameter of the split-ring 120 so that the split-ring 120 is prevented from moving proximally into bore 140 and is maintained within chamber 142.

Figure 13A:
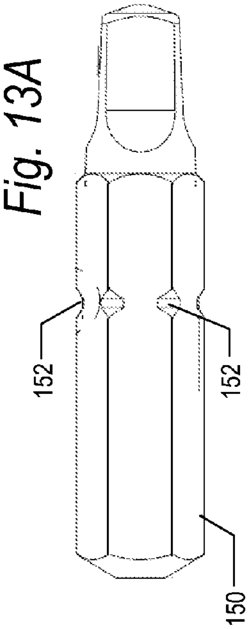
FIG. 13A is a side view of a bit according to an embodiment of the present technology.
Figure 13:
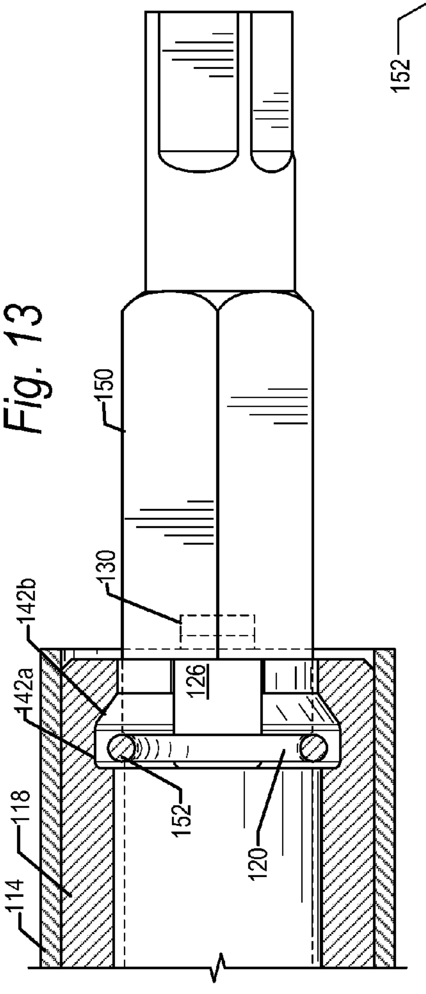
FIG. 13 is a cross-sectional view of an end of the mandrel according to the present technology with a bit and with the cover in an unbiased position.

FIG. 13 is a cross-sectional view as in FIG. 10. However, the view of FIG. 13 further shows a screw bit 150 engaged within the bore 140 and chamber 142. As seen for example in FIG. 13A, an embodiment of the screw bit 150 includes an annular groove 152 around a circumference of the bit. The screw bit 150 is shown in phantom within the socket in socket 118 in FIGS. 13 and 14 to allow clear illustration of the operation of the components of mandrel 104 to securely hold and release the bit 150. When the bit 150 is inserted into the socket 118, the bit extends through the split-ring 120. In an unbiased condition, the diameter of the split-ring 120 is slightly smaller than the diameter of the bit 150. The split-ring 120 expands to receive the bit 150 and fits tightly around the bit 150.

When the bit 150 is inserted to its full extent, the bit groove 152 aligns with the split-ring 120 within the cylindrical portion 142*b* of chamber 142. This is the position shown in FIG. 13. Engaged within both the bit groove 152 and cylindrical portion 142*a*, the split-ring 120 holds the bit 150 in place for driving screws into workpieces under a torque and translational load exerted by screwdriver 100.

Figure 14:
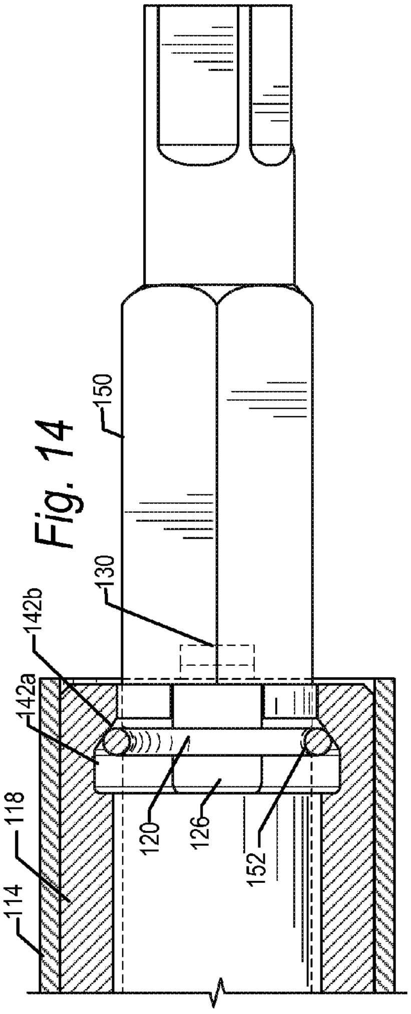
FIG. 14 is a cross-sectional view of an end of the mandrel according to the present technology with a bit pulled distally and with the cover in an unbiased position.

FIG. 14 shows a cross-sectional view as in FIG. 13, with the change that a force is exerted on the screw bit 150 in the distal direction, attempting to remove the bit 150 from the mandrel 104. The split-ring 120, engaged within bit groove 152, moves distally with the bit 150. At some point during the distal movement, the split-ring 120 engages against a conical sidewall in conical section 142*b*, as shown in FIG. 14. The amount of distal motion which may take place from FIG. 13 to FIG. 14 may be small, such as for example ⅛th inch, though it may be smaller or larger in further embodiments.

Once the split-ring 120 engages the conical sidewall of conical section 142*b*, any further distal force on screw bit 150 wedges the split-ring 120 more tightly within the bit groove 152, and further prevents the bit from being withdrawn from the mandrel 104.

Figure 15:
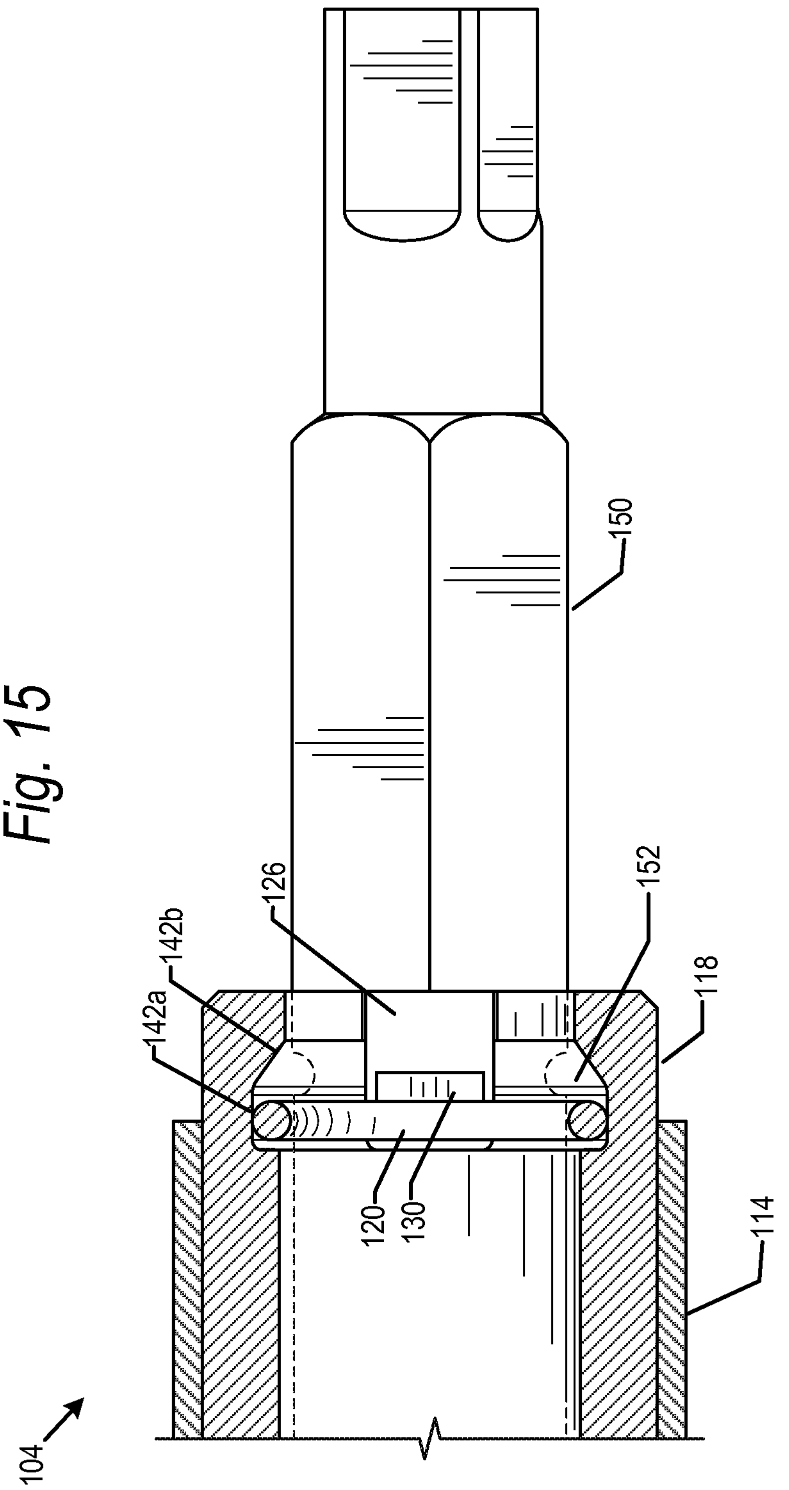
FIG. 15 is a cross-sectional view of an end of the mandrel according to the present technology with a bit pulled distally and with the cover in a translated position.
Figure 16:
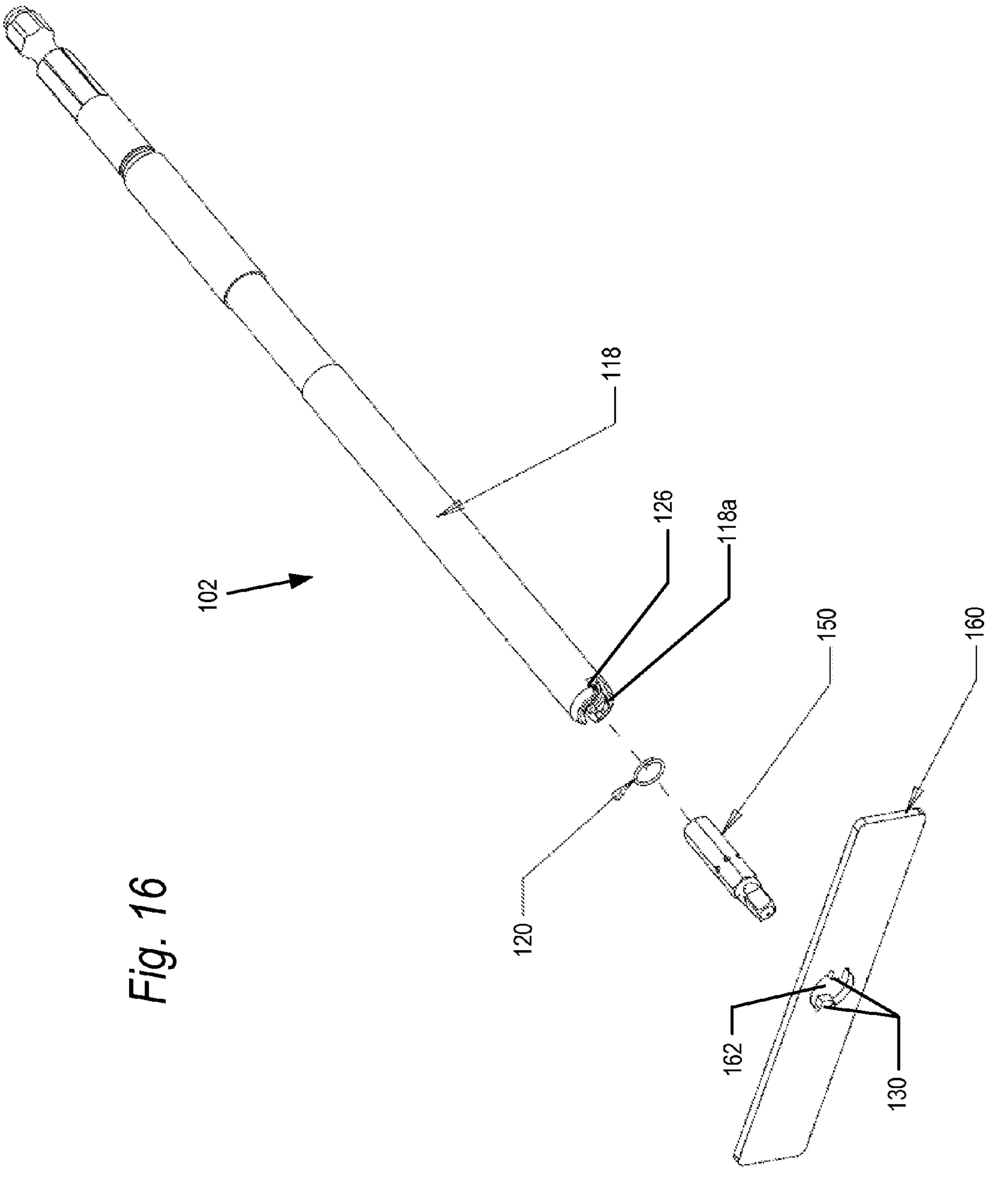
FIG. 16 is an exploded perspective view of an alternative embodiment of the present technology including a separated release mechanism.

FIG. 15 shows a cross-sectional view of the distal end of mandrel 104 including the screw bit 150 as in FIG. 14. In this illustration, the user has performed the secondary action of pulling the cover 114 proximally (as in FIG. 12). As a result, the ears 130 engage the split-ring 120 and pull it proximally away from conical section 142*b* and into cylindrical section 142*a*. With the split-ring 120 held in the cylindrical section 142*a* by ears 130, the split-ring 120 is free to expand radially out of the bit groove 152. Thus, the action of pulling the bit 150 distally with a force sufficient to expand the split-ring 120, when accompanied by the secondary action of moving the cover proximally, will allow the bit 150 to be freely removed from the mandrel 104.

A split-ring has been described above as the locking mechanism which moves within chamber 142 so as to bind the bit 150 within the mandrel 104 (when the ring is in a distal position), and to allow removal of the bit 150 from the mandrel (when placed in the proximal position by the ears 130). In further embodiments, it is understood that other locking mechanisms may be provided within the socket 118 to affect the same operation. For example, instead of split-ring 120 in an annular chamber 142, the locking mechanism may be a ball-lock mechanism where a ball is mounted in an annular chamber. Instead of an annular chamber, which extends radially 360° around the central axis 122, a notch may be provided, which extends for example 10°-20° around the central axis 122, big enough to house the ball-lock. In this example, the ball-lock would reside in the slot. If attempt to pull the screw bit out is made without the secondary action, the ball-lock would wedge in the bit groove 152 and against the conical wall of conical section 142*b*. However, upon the secondary action of moving the cover proximally, an ear 130 can engage the ball and move it back to a larger diameter section, whereupon the screw bit 150 may be removed. Other mechanisms are contemplated.

In the embodiments described above, the release mechanism (cover 114) was affixed to the axial drive assembly 102. However, in a further embodiment shown in FIG. 16, the release mechanism may be separate from the axial drive assembly. In this embodiment, the socket 118, socket end 118*a*, split-ring 120 and bit 150 as shown in the exploded perspective view of FIG. 16 may be as described above. The bit 150 may be inserted into the socket 118, whereupon the bit 150 is held in the socket by the ring engaging within the bit groove 152 and held therein by annular chamber 142 (shown and described above with respect to FIGS. 13 and 14. In order to release the bit in the embodiment of FIG. 16, a release mechanism in the form of plate 160 is slid over end 118*a* of socket 118. The plate 160 includes a pair of ears 130 mounted in an opening 162. The ears 130 operate as described above. In particular, when the plate 160 is slid over end 118*a*, the ears 130 of plate 160 engage within slots 126 in end 118*a* to bias the split-ring 120 distally within the chamber 142. At that point, the bit 150 may be removed.

The shape of plate 160 may vary in embodiments, with the provision that it include ears 130, or similarly defined structures, that are capable of engaging within slots 126 to bias the split-ring 120 distally.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

What is claimed is:

1. A mandrel for releasably holding a bit within a distal end of the mandrel, the bit including a bit groove, the mandrel comprising:

a socket for receiving the bit, the socket including a locking mechanism mounted within a chamber in an interior of the socket, the locking mechanism moving between a first position where the locking mechanism binds between the bit groove of the bit and a wall of the socket as the bit is pulled distally to prevent distal withdrawal of the bit, and a second position where the locking mechanism may be removed from the bit groove as the bit is pulled distally; and a release mechanism translationally mounted to the socket and circumjacent about the socket, the release mechanism capable of moving the locking mechanism from the first position to the second position as the bit is pulled distally, and the release mechanism includes at least one ear translationally mounted within a slot formed in a distal end of the socket, the ear bearing against the locking mechanism to move the locking mechanism from the first position to the second position.

2. The mandrel of claim 1, wherein the chamber includes a cylindrical section and a conical section, the locking mechanism binding between the bit groove and a sloped wall of the conical section in the first position.

3. The mandrel of claim 2, wherein the release mechanism moves the locking mechanism from the conical section to the cylindrical section, the locking mechanism capable of disengaging from the bit groove in the cylindrical section as the bit is pulled distally.

4. The mandrel of claim 1, wherein the locking mechanism is a split-ring having a diameter to fit snugly within the bit groove, but being flexible so as to be able to expand to a diameter larger than a diameter of the bit groove.

5. A mandrel of a screwdriver for releasably holding a bit within a distal end of the mandrel, the bit including a bit groove, the mandrel comprising:

a socket for receiving the bit, the socket including an annular split-ring mounted within a chamber in an interior of the socket, the split-ring moving between a first position where the split-ring binds between the bit groove of the bit and a sloped wall of the chamber as the bit is pulled distally to prevent distal withdrawal of the bit, and a second position where the split-ring may expand and be removed from the bit groove as the bit is pulled distally; and a release mechanism translationally mounted to the socket, the release mechanism including at least one ear capable of moving the split-ring from the first position to the second position as the bit is pulled distally, wherein the release mechanism includes a two ears spaced apart from each other and mounted at the distal end of the release mechanism, the two ears extending from the distal end of the cylinder toward a center of the socket.

6. The mandrel of claim 5, wherein the release mechanism is a cylinder mounted circumjacent about the socket and having a distal end that is coplanar with a distal end of the socket.

7. The mandrel of claim 5, wherein the release mechanism is a plate, independent from the socket, the plate including at least one ear mounted in an opening in the plate and extending toward a center of the opening.

8. The mandrel of claim 5, wherein the chamber includes a cylindrical section and a conical section, the locking mechanism binding between the bit groove and a sloped wall of the conical section in the first position.

9. The mandrel of claim 8, wherein the at least one ear moves the split-ring from the conical section to the cylindrical section, the split-ring capable of disengaging from the bit groove in the cylindrical section as the bit is pulled distally.

10. The mandrel of claim 5, wherein the socket is fixedly mounted to a shaft of a screwdriver.

11. The mandrel of claim 5, wherein the screwdriver is a power screwdriver.

* * * * *